United States Patent [19]
Beikman

[11] Patent Number: 4,500,242
[45] Date of Patent: Feb. 19, 1985

[54] APPARATUS AND METHOD OF HANDLING BALES
[76] Inventor: Douglas L. Beikman, R.R. #2 Box 24, Linn, Kans. 66953
[21] Appl. No.: 455,106
[22] Filed: Mar. 9, 1983
[51] Int. Cl.³ .......................... A01D 87/12; B60P 1/16
[52] U.S. Cl. ................................... 414/24.5; 280/421; 298/8 R; 298/18
[58] Field of Search ...................... 414/24.5, 24.6, 786; 298/8 R, 18; 280/421; 105/263

[56] References Cited
U.S. PATENT DOCUMENTS

| | | | |
|---|---|---|---|
| 769,752 | 9/1904 | Lawson | 105/263 |
| 3,791,673 | 2/1974 | Hornung | 280/421 X |
| 3,922,036 | 11/1975 | Kalsbeck et al. | 298/18 |
| 4,079,996 | 3/1978 | Vansickle | 298/18 X |
| 4,092,050 | 5/1978 | Sobeck | 298/18 |
| 4,261,676 | 4/1981 | Balling | 298/18 X |

FOREIGN PATENT DOCUMENTS
1065808 11/1979 Canada .............................. 414/24.5

Primary Examiner—Leslie J. Paperner
Attorney, Agent, or Firm—John H. Widdowson

[57] ABSTRACT

An apparatus for handling bales having a frame, an axle secured to the frame, and a pair of wheels rotatably attached to the axle for supporting the frame. A pair of arcuate shaped baskets is mounted on the frame for holding the bales. A pair of hydraulic cylinders are secured to the frame for receiving power take off from a tractor to pivot the baskets along the longitudinal axis thereof for dumping the bales onto the ground. The method includes the steps of loading the bales into the baskets and pivoting the baskets to dump the bales.

1 Claim, 6 Drawing Figures

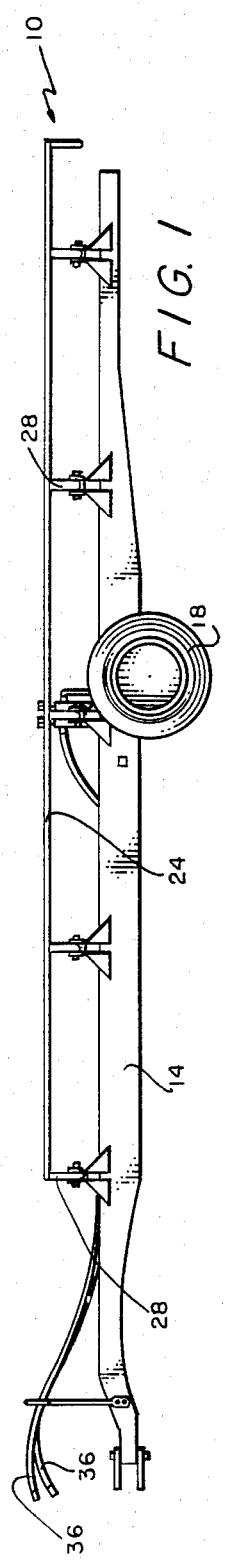
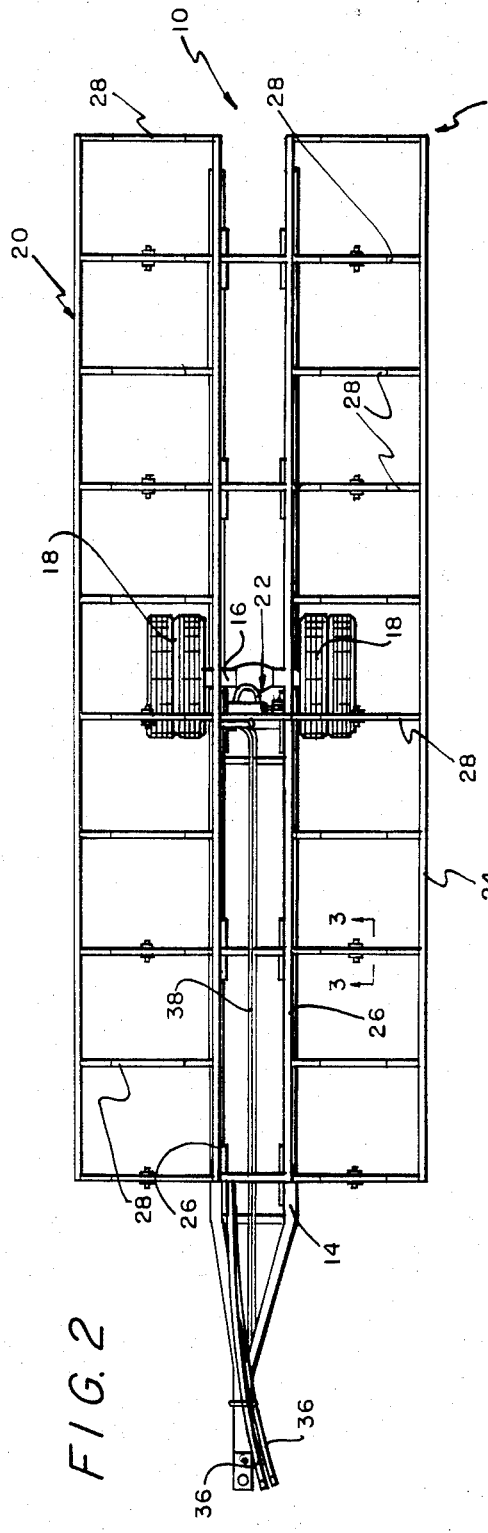
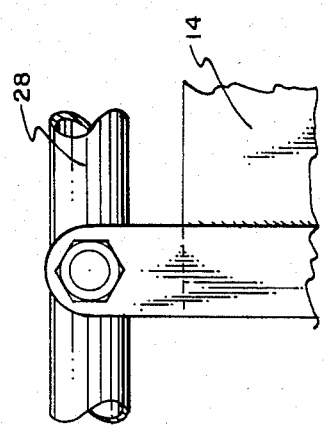
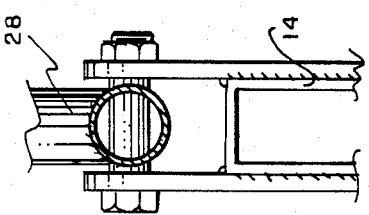

APPARATUS AND METHOD OF HANDLING BALES

BACKGROUND OF THE INVENTION

1. Field of the Invention

This invention relates to an apparatus and method for handling bales. More specifically, this invention provides a trailer for hauling and dumping bales, and a method which employs use of the trailer for handling the bales.

2. Description of the Prior Art

U.S. Pat. No. 4,138,159 Hall illustrates a single row bale carrier wherein the bales may be carried in cradles mounted on the tractor and which cradles are generally pivoted at a central location. U.S. Pat. No. 4,261,676 by Balling, Sr. also discloses a bale carrier which includes means to lift the bales from the ground on to the generally U-shaped cradle, and further includes hydraulic means whereby the cradle may be tilted to effect dumping of the bales from the carrier. Additional bale handling apparatuses are disclosed in U.S. Pat. No. 4,253,786 by Harkness and U.S. Pat. No. 4,329,101 by Green et al. None of the foregoing prior art teaches or suggests the particular apparatus and method for handling bales of this invention.

SUMMARY OF THE INVENTION

It is therefore an object of this invention to provide an apparatus and method for handling bales.

Still other objects will be apparent to those skilled in the art from the following description of this invention.

The foregoing objects are achieved according to the practice of this invention. Broadly, this invention comprises an apparatus for handling bales which includes a frame, an axle secured to the frame, and a pair of wheels rotatably attached to the axle for supporting the frame. A pair of generally arcuate shaped basket means is pivotally mounted on the frame for holding bales. Hydraulic means attaches to the frame for receiving power take off from a tractor or the like, to pivot the basket means along the longitudinal axis thereof for dumping the bales onto the ground. The method of handling bales comprises the steps of loading the bales onto a pair of generally acruate shaped baskets which are pivotally mounted on a frame being supported by a pair of wheels rotatably attached to an axle which is secured to the frame; and pivoting the baskets along the longitudinal axis thereof to dump the bales onto the ground.

BRIEF DESCRIPTION OF THE DRAWINGS

FIG. 1 is a side elevational view of the invention;

FIG. 2 is a top plan view of the invention;

FIG. 3 is a vertical sectional view taken in direction of the arrows and along the plane of line 3—3 in FIG. 2;

FIG. 4 is a side elevational view of the segment of the invention in FIG. 3;

DETAILED DESCRIPTION OF THE INVENTION

Figure 5:
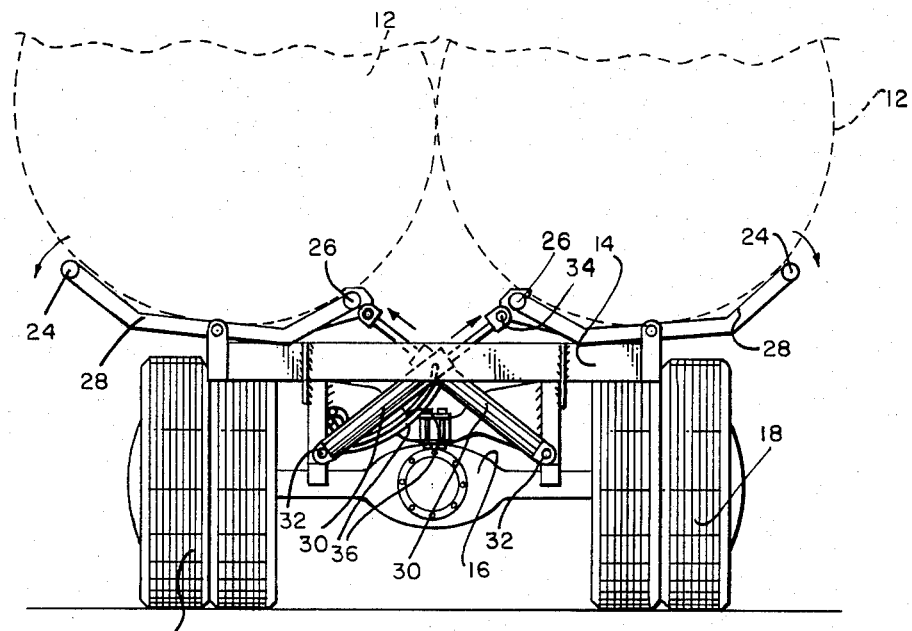
FIG. 5 is an end view illustrating the hydraulic cylinders and their attachment to the frame and baskets which are carrying the bales.

Referring in detail now to the drawings wherein similar parts of the invention are identified by like reference numerals, there is seen the trailer or apparatus, generally illustrated as 10, for handling bales 12. The apparatus 10 has a frame 14, an axle 16 secured to the frame 14, and a pair of wheels 18—18 rotatably attached to the axle 16 for supporting the frame 14.

Figure 6:
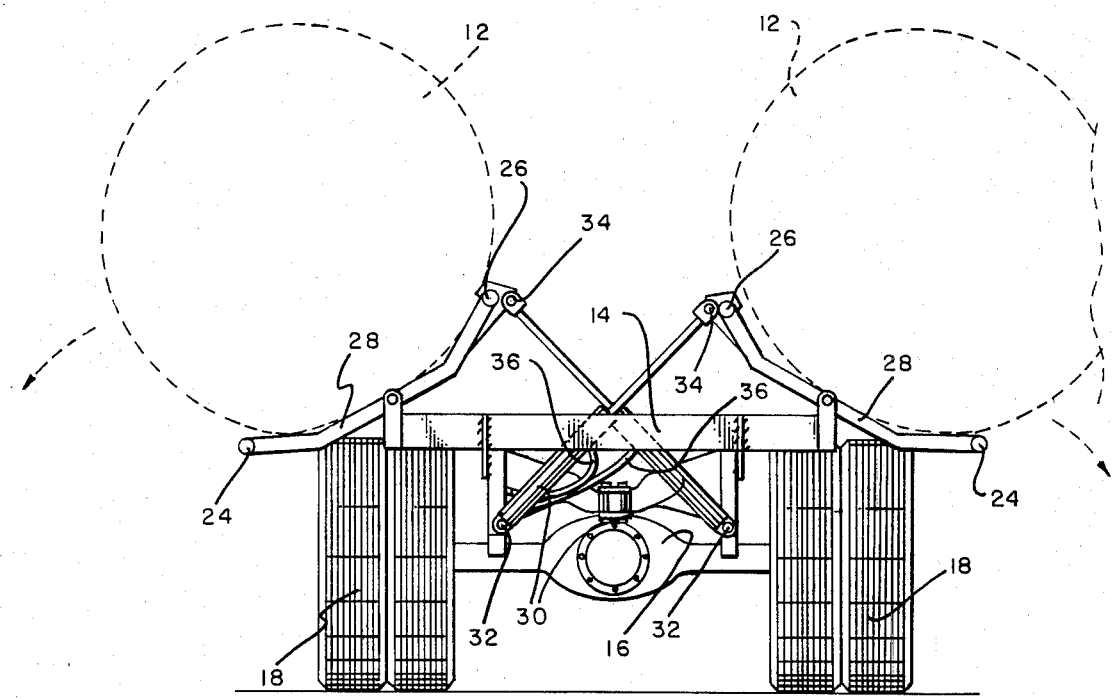
FIG. 6 is the end view of FIG. 5 with the hydraulic cylinders in the process of rotating the baskets to dump the bales onto the ground.

A pair of arcuate shaped basket means, generally illustrated as 20—20 (in FIG. 2), is pivotally mounted on the frame 14 for holding the bales 12. Hydraulic means, generally illustrated as 22 in FIG. 2, attaches to the frame 14 for receiving power take off from a tractor (not shown in the drawings), or the like, to pivot the basket means 20—20 along the longitudinal axis thereof for dumping the bales 12 onto the ground as illustrated in FIG. 6.

Each of the basket means 20—20 comprises an outside support rail 24, an inside support rail 26, and a plurality of arcuate shaped ribs 28 interconnected to the rails 24, 26 as illustrated in FIG. 2. The hydraulic means 22 includes a pair of hydraulic cylinders 30—30 (see FIGS. 5 and 6) having one end 32 secured to the frame 14 and another end 34 attached to the inside support rail 26. The hydraulic cylinders 30—30 are crosswise disposed with respect to each other as illustrated in FIGS. 5 and 6. A pair of hydraulic hoses 36—36 extend from the tractor through a rectangular tube 38, that is secured to the frame 14, to hook up with the hydraulic cylinders 30—30.

With continual reference to the drawings for operation of the invention, bales 12 are loaded onto the basket means 20—20 by a bale fork or the like. The bales 12 are laid in such a way that the roundness of the bale 12 registers with the arcuate shaped ribs 28 of the basket means 20—20, as illustrated in FIG. 5. When the trailer 10 reaches its desired destination for dumping the bales 12, hydraulic power is generated from the tractor, or the like, through the hydraulic hoses 36—36 to the hydraulic cylinders 30—30. This causes the hydraulic cylinders 30—30, which engage the inside support rails 26—26, to upwardly urge or bias the inside support rails 26—26, in order to pivot the basket means 20—20 along the longitudinal axis thereof (see FIG. 6) to lower the outside support rails 24—24 and cause the bales 12 to roll off the basket means 20—20 and be dumped on the ground. After all bales 12 have rolled off the basket means 20—20, the basket means 20—20 may be returned to their horizontal carrying position of FIG. 5. It should be understood that both cylinders 30—30 do not have to be activated simultaneously. They may be activated at different times with respect to the position of the trailer 10 and the desired location to dump the bales 12.

While the present invention has been described herein with reference to particlar embodiments thereof, a latitude of modifications, various changes and substitutions are intended in the foregoing disclosure, and it will be appreciated that in some instances some features of the invention will be employed without a corresponding use of other features without departing from the scope of the invention as set forth.

I claim:

1. An apparatus for handling bales comprising a frame;

an axle secured to said frame;

a pair of wheels rotatably attached to said axle for supporting said frame;

a pair of generally arcuate shaped basket means pitvotally mounted on said frame for holding bales;

and hydraulic means attached to said frame for receiving power take off from a tractor, or the like, to pivot the basket means along the longitudinal axis thereof for dumping the bales onto the ground, each of said pair of basket means comprises an outside support rail, an inside support rail, and a plurality of arcuate shaped ribs interconnected to said rails, said hydraulic means engages each of said pair of basket means on the inside rail thereof, said hydraulic means comprises a pair of hydraulic cylinders connected to said frame in proximity to the axle and crosswise disposed with respect to each other;

a pair of hydraulic hoses extending from the tractor, or the like, to said pair of hydraulic cylinders; and a rectangular tube attached to said frame, said hydraulic hoses being disposed within said tube while extending from the tractor, or the like, to said pair of hydraulic cylinders.

* * * * *